(12) United States Patent
Greenberg et al.

(10) Patent No.: US 11,480,678 B2
(45) Date of Patent: Oct. 25, 2022

(54) SYSTEM AND METHOD FOR CALCULATING A BINARY CROSS-CORRELATION

(71) Applicant: RAYTHEON COMPANY, Waltham, MA (US)

(72) Inventors: Adam Hodge Greenberg, Los Angeles, CA (US); Eran Marcus, Culver City, CA (US)

(73) Assignee: RAYTHEON COMPANY, Waltham, MA (US)

(*) Notice: Subject to any disclaimer, the term of this patent is extended or adjusted under 35 U.S.C. 154(b) by 244 days.

(21) Appl. No.: 16/863,484

(22) Filed: Apr. 30, 2020

(65) Prior Publication Data
US 2021/0341606 A1 Nov. 4, 2021

(51) Int. Cl.
*G01S 17/10* (2020.01)
*G01S 7/484* (2006.01)
*G01S 7/4861* (2020.01)
*G01S 7/487* (2006.01)

(52) U.S. Cl.
CPC .............. *G01S 17/10* (2013.01); *G01S 7/484* (2013.01); *G01S 7/487* (2013.01); *G01S 7/4861* (2013.01)

(58) Field of Classification Search
CPC ........ G01S 17/10; G01S 7/484; G01S 7/4861; G01S 7/487; G01S 7/4865
See application file for complete search history.

(56) References Cited

U.S. PATENT DOCUMENTS

| | | | | |
|---|---|---|---|---|
| 5,889,490 A | * | 3/1999 | Wachter | .................. G01S 17/10 342/127 |
| 9,858,304 B2 | | 1/2018 | Marcus et al. | |
| 10,371,818 B2 | | 8/2019 | Marcus et al. | |
| 2016/0350346 A1 | * | 12/2016 | Marcus | .................. G06F 17/142 |
| 2018/0299536 A1 | | 10/2018 | Marron et al. | |
| 2018/0364360 A1 | | 12/2018 | Zellinger et al. | |
| 2019/0056497 A1 | | 2/2019 | Pacala et al. | |
| 2019/0086521 A1 | * | 3/2019 | Boutaud | ............... G01S 17/894 |

FOREIGN PATENT DOCUMENTS

WO WO 2019/145078 A1 8/2019

OTHER PUBLICATIONS

International Search Report for corresponding International Application No. PCT/US2020/066671, filed Dec. 22, 2020, International Search Report dated Apr. 13, 2021 and dated Apr. 26, 2021 (4 pgs.).

(Continued)

*Primary Examiner* — Jonathan M Hansen
(74) *Attorney, Agent, or Firm* — Lewis Roca Rothgerber Christie LLP

(57) ABSTRACT

A method for operating a laser detection and ranging system. In some embodiments, the method includes transmitting a plurality of laser pulses, each at a respective one of a plurality of pulse transmission times; detecting a plurality of return pulses, each at a respective one of a plurality of return pulse times; forming a first time difference, the first time difference being the difference between a first return pulse time of the plurality of return pulse times and a first pulse transmission time of the plurality of pulse transmission times; and incrementing a first element of a first array, the first element of the first array having an index based on the first time difference.

16 Claims, 2 Drawing Sheets

(56) References Cited

OTHER PUBLICATIONS

Written Opinion of the International Searching Authority for corresponding International Application No. PCT/US2020/066671, filed Dec. 22, 2020, Written Opinion of the International Searching Authority dated Apr. 26, 2021 (6 pgs.).

Bansal, S. et al., "Nature-inspired metaheuristic algorithms to find near-OGR sequences for WDM channel allocation and their performance comparison", Opten Math, 2017, pp. 520-547, De Gruyter Open.

Dimitromanolakis, A., "Analysis of the Golomb Rulerand the Sidon Set Problems, and Determination of Large, Near-Optimal Golomb Rulers", Department of Electronic and Computer Engineering Technical University of Crete, Jun. 2002, 118 pages.

Erdos, P. et al., "On a Problem of Sidon in Additive Number Theory, and on Some Related Problems", Journal of the London Mathematical Society, 1941, vol. 16, pp. 212-215, C.F. Hodgson & Son, Ltd., London.

Fluckiger, D.U. et al., "Optimal pseudorandom pulse position modulation ladar waveforms", Applied Optics, Mar. 20, 2015, pp. 2183-2186, vol. 54, No. 9, Optical Society of America.

Gagliardi, R. et al., "Acquisition Sequences in PPM Communications", IEEE Transactions on Information Theory, Sep. 1987, pp. 738-744, vol. IT-33, No. 5, IEEE.

Hiskett, P.A. et al., "A photon-counting time-of-flight ranging technique developed for the avoidance of range ambiguity at gigahertz clock rates", Optics Express, Sep. 1, 2008, pp. 13685-13698, vol. 16, No. 18, Optical Society of America.

Mao, X. et al., "Pulse position modulation for compact all-fiber vehicle laser rangefinder development," Optical Engineering, Oct. 2017, pp. 107102-1 through 107102-8, vol. 56, No. 10, SPIE.

Milstein, A.B. et al., "Acquisition algorithm for direct-detection ladars with Geiger-mode avalanche photodiodes", Applied Optics, Jan. 10, 2008, pp. 296-311, vol. 47, No. 2, Optical Society of America.

U.S. Appl. No. 16/863,055, filed Apr. 30, 2020, unpublished application.

U.S. Appl. No. 16/863,064, filed Apr. 30, 2020, unpublished application.

U.S. Appl. No. 16/863,262, filed Apr. 30, 2020, unpublished application.

U.S. Appl. No. 16/863,744, filed Apr. 30, 2020, unpublished application.

U.S. Appl. No. 16/863,792, filed Apr. 30, 2020, unpublished application.

U.S. Appl. No. 16/863,826, filed Apr. 30, 2020, unpublished application.

U.S. Appl. No. 16/863,858, filed Apr. 30, 2020, unpublished application.

* cited by examiner

SYSTEM AND METHOD FOR CALCULATING A BINARY CROSS-CORRELATION

GOVERNMENT LICENSE RIGHTS

This invention was made with Government support. The Government has certain rights in the invention.

FIELD

One or more aspects of embodiments according to the present invention relate to lidar systems, and more particularly to a system and method for calculating a correlation in a lidar system.

BACKGROUND

Pulsed laser radar sensors, also known as lidars, laser detection and ranging systems, or ladars, are active sensing systems that determine the range to a target by measuring the time of flight of short laser pulses reflected off the target. A lidar system generally includes three primary subsystems: a laser transmitter, an optical receiver, and a processor. The transmitter is capable of generating laser pulses when commanded, and of directing these pulses in the direction of the target. A key characteristic of these pulses is that they are each 1-25 nanoseconds in duration, so that the resulting range measurement may be accurate to within a few meters.

The receiver includes an optical system capable of collecting light reflected from the target, and a photodetector that can record the arrival of reflected light. The photodetector is capable of timing the arrival of return pulses with an accuracy similar in scale to the laser pulse duration. The processor is configured to control the operation of the transmitter and receiver, and to extract information about the target from the detections made by the receiver. The processor is also capable of synchronizing the commands issued to the transmitter and the receiver. An essential aspect of the return processing is the ability to determine target characteristics accurately despite complex scattering of the transmitted light, imperfect detection of the returns, unwanted detections due to ambient light and electrical noise, and modulation of the return due to target motion, among other practical complications.

In common operational conditions, the target return from a single transmitted pulse is not sufficient for target detection, and multiple pulses must be used. As is well-known in the art, the pulse waveform, or sequence of times at which pulses are transmitted, need to be selected carefully to allow unambiguous interpretation of the returns. If pulses are widely spaced, it may be straightforward to associate specific returns with their corresponding transmit pulses, but the integration (or dwell) time required to transmit and receive a sufficient number of pulses may be excessive. If pulses are repeated at higher frequency, the integration time decreases, but the time of flight calculation may become ambiguous.

Some problems of range ambiguity can be solved with the use of waveforms that apply some type of encoding to each pulse. One such encoding generates pulse position modulated (PPM) waveforms. PPM encodes waveforms by modulating the position of each outgoing pulse with respect to some nominal underlying position. This underlying position is determined by the pulse number multiplied by the waveform's nominal Pulse Repetition Frequency (PRF). PPM encoding works adequately in some cases, but current methods of constructing these waveforms are computationally intensive and limited in applicability.

The conventional technique for determining time of flight from an extended pulsed waveform is to compute the cross-correlation between the transmit waveform and a set of recorded photodetection times. For detectors that produce sparse photodetection sequences, an efficient known method for computing the cross-correlation is provided in U.S. Pat. No. 9,858,304, the entire contents of which is hereby expressly incorporated by reference. However, this method is limited to post-collection processing, which limits the speed at which range estimates may be determined. Furthermore, this method does not account for waveform compression or stretching due to target motion. Thus, enhanced signal processing techniques that can reduce cross-correlation latency and operate effectively in the presence of arbitrary motion are needed.

SUMMARY

According to an embodiment of the present invention, there is provided a method for operating a laser detection and ranging system, the method including: transmitting a plurality of laser pulses, each at a respective one of a plurality of pulse transmission times; detecting a plurality of return pulses, each at a respective one of a plurality of return pulse times; forming a first time difference, the first time difference being the difference between a first return pulse time of the plurality of return pulse times and a first pulse transmission time of the plurality of pulse transmission times; and incrementing a first element of a first array, the first element of the first array having an index based on the first time difference.

In some embodiments, the first element of the first array has a size of n memory words, and the index equals n times the time difference plus an offset.

In some embodiments, the method further includes: forming a second time difference, the second time difference being the difference between a second pulse transmission time of the plurality of pulse transmission times and a second return pulse time of the plurality of return pulse times, and incrementing a second element of the first array, the second element of the first array having an index based on the second time difference.

In some embodiments, the first element of the first array has a size of n memory words, and the index of the second element of the first array equals n times the second time difference plus the offset.

In some embodiments, the method further includes calculating a plurality of time differences including the first time difference, the calculating of the plurality of time differences including calculating all time differences between a first subset of the pulse transmission times and a first subset of the return pulse times.

In some embodiments, the method further includes calculating all time differences between a second subset of the pulse transmission times and a second subset of the return pulse times, wherein: a pulse transmission time of the second subset of the pulse transmission times is greater than a pulse transmission time of the first subset of the pulse transmission times, and a pulse transmission time of the second subset of the return pulse times is greater than a pulse transmission time of the first subset of the return pulse times.

In some embodiments: the transmitting of the plurality of laser pulses includes transmitting a first burst of laser pulses of the plurality of laser pulses, waiting during an inter-burst interval, and transmitting a second burst of laser pulses of the plurality of laser pulses; each of the pulse transmission times of the first subset of the pulse transmission times is a pulse transmission time of a pulse of the first burst; and each of the pulse transmission times of the second subset of the pulse transmission times is a pulse transmission time of a pulse of the second burst.

In some embodiments, the method further includes allocating a region of memory for the first array, the region of memory having a size based on the difference between: the difference between an earliest return pulse time of the plurality of return pulse times and a latest pulse transmission time of the plurality of pulse transmission times; and the difference between a latest return pulse time of the plurality of return pulse times and an earliest pulse transmission time of the plurality of pulse transmission times.

In some embodiments, the method further includes: estimating a range to a target, and allocating a region of memory for the first array, the region of memory having a size based on an uncertainty in the estimated range to the target.

In some embodiments, the method further includes multiplying each element of the first array by an attenuation factor, the attenuation factor being a positive number less than 1.

According to an embodiment of the present invention, there is provided a laser detection and ranging system, including: a laser transmitter; a receiver; and a processing circuit, the processing circuit being configured to: transmit, through the transmitter, a plurality of laser pulses, each at a respective one of a plurality of pulse transmission times; detect, using the receiver, a plurality of return pulses, each at a respective one of a plurality of return pulse times; form a first time difference, the first time difference being the difference between a first return pulse time of the plurality of return pulse times and a first pulse transmission time of the plurality of pulse transmission times; and increment a first element of a first array, the first element of the first array having an index based on the first time difference.

In some embodiments, the first element of the first array has a size of n memory words, and the index equals n times the time difference plus an offset.

In some embodiments, the processing circuit is further configured to: form a second time difference, the second time difference being the difference between a second pulse transmission time of the plurality of pulse transmission times and a second return pulse time of the plurality of return pulse times, and increment a second element of the first array, the second element of the first array having an index based on the second time difference.

In some embodiments, the first element of the first array has a size of n memory words, and the index of the second element of the first array equals n times the second time difference plus the offset.

In some embodiments, the processing circuit is further configured to calculate a plurality of time differences including the first time difference, the calculating of the plurality of time differences including calculating all time differences between a first subset of the pulse transmission times and a first subset of the return pulse times.

In some embodiments, the processing circuit is further configured to calculate all time differences between a second subset of the pulse transmission times and a second subset of the return pulse times, wherein: a pulse transmission time of the second subset of the pulse transmission times is greater than a pulse transmission time of the first subset of the pulse transmission times, and a pulse transmission time of the second subset of the return pulse times is greater than a pulse transmission time of the first subset of the return pulse times.

In some embodiments: the transmitting of the plurality of laser pulses includes transmitting a first burst of laser pulses of the plurality of laser pulses, waiting during an inter-burst interval, and transmitting a second burst of laser pulses of the plurality of laser pulses; each of the pulse transmission times of the first subset of the pulse transmission times is a pulse transmission time of a pulse of the first burst; and each of the pulse transmission times of the second subset of the pulse transmission times is a pulse transmission time of a pulse of the second burst.

In some embodiments, the processing circuit is further configured to allocate a region of memory for the first array, the region of memory having a size based on the difference between: the difference between an earliest return pulse time of the plurality of return pulse times and a latest pulse transmission time of the plurality of pulse transmission times; and the difference between a latest return pulse time of the plurality of return pulse times and an earliest pulse transmission time of the plurality of pulse transmission times.

In some embodiments, the processing circuit is further configured to: estimate a range to a target, and allocate a region of memory for the first array, the region of memory having a size based on an uncertainty in the estimated range to the target.

In some embodiments, the processing circuit is further configured to multiply each element of the first array by an attenuation factor, the attenuation factor being a positive number less than 1.

BRIEF DESCRIPTION OF THE DRAWINGS

Features, aspects, and embodiments are described in conjunction with the attached drawings, in which.

DETAILED DESCRIPTION

The detailed description set forth below in connection with the appended drawings is intended as a description of exemplary embodiments of a system and method for calculating a cross-correlation provided in accordance with the present invention and is not intended to represent the only forms in which the present invention may be constructed or utilized. The description sets forth the features of the present invention in connection with the illustrated embodiments. It is to be understood, however, that the same or equivalent functions and structures may be accomplished by different embodiments that are also intended to be encompassed within the scope of the invention. As denoted elsewhere herein, like element numbers are intended to indicate like elements or features.

Figure 1:
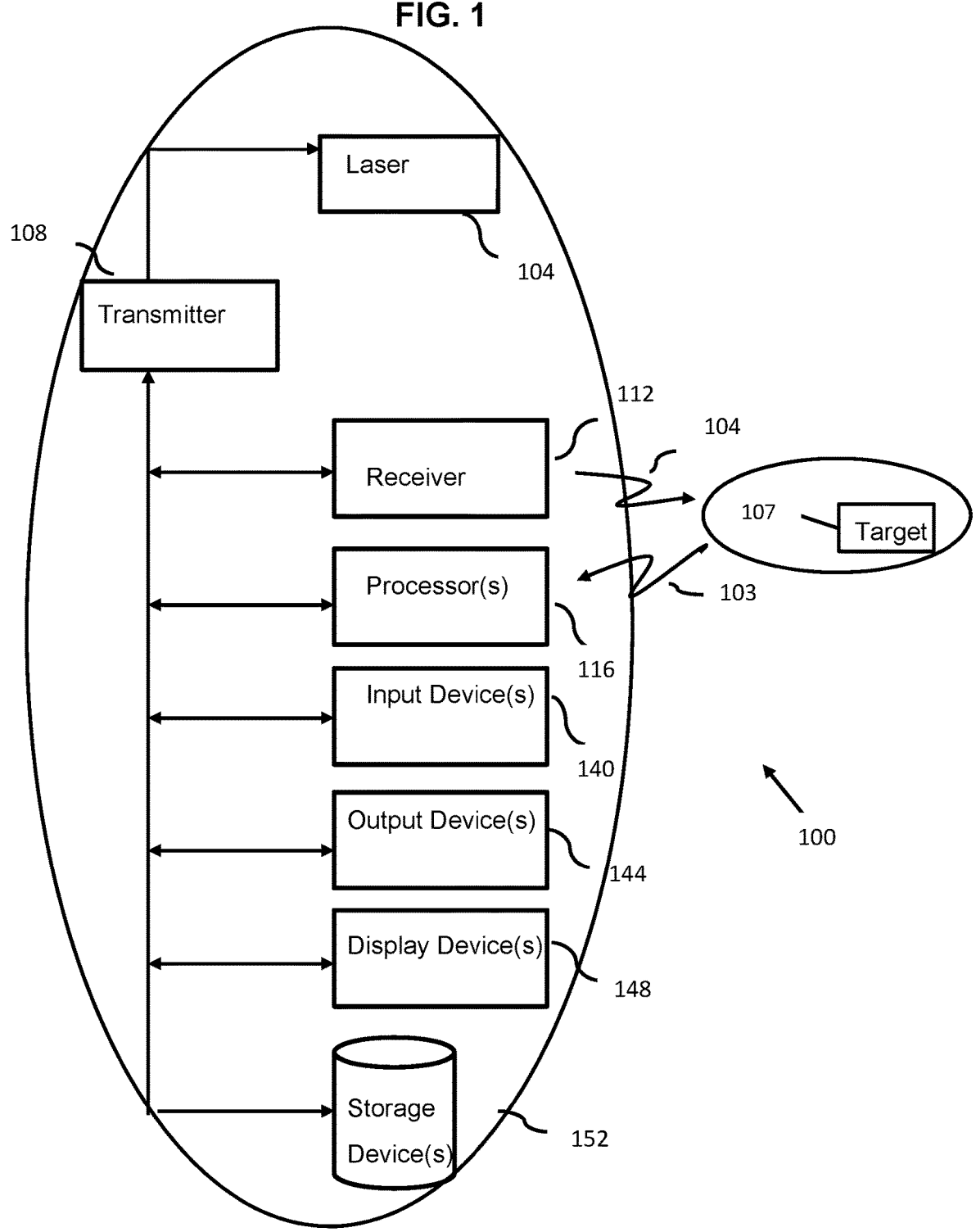
FIG. 1 is a block diagram of a lidar system, according to an embodiment of the present invention.

FIG. 1 is a system block diagram of an exemplary lidar system 100, according to some embodiments of the disclosed invention. As shown, a lidar platform includes a laser 104, a laser transmitter 108 (which is connected to the laser 104 as shown, or which may contain the laser 104) and a receiver 112. The transmitter 108 sends lidar transmission pulses 124 towards one or more targets 107 within a region of interest. lidar return pulses (samples) 103 are generated in response to the lidar transmission pulses reflecting off of a plurality of objects (targets) within the region of interest. In some embodiments, the echo from each target (as seen at the receiver) is a version of the transmitted signal that is 1) time delayed by the transit time from transmitter to target to receiver, 2) frequency shifted due to target motion, and 3) attenuated by some factor. The receiver observes a return signal consisting of each of the target echoes (plus random noise).

System 100 also includes one or more input devices 140, one or more output devices 144, one or more display devices 148, one or more processing circuits (or "processors") 116 (discussed in further detail below), and one or more storage devices 152. The modules and devices described herein can, for example, utilize the one or more processing circuits 116 to execute computer executable instructions and/or the modules and devices described herein and may include their own processor to execute computer executable instructions. As known in the art, the one or more processing circuits 116 include their own memories, such as RAMs and ROMs to store and execute program instructions. One skilled in the art would understand that the system 100 can include, for example, other modules, devices, and/or processors known in the art and/or varieties of the described modules, devices, analog-to digital converters (ADCs), digital-to-analog converters (DACs), and/or processors.

The input devices 140 receive information from a user (not shown) and/or another computing system (not shown). The input devices 140 can include, for example, Bluetooth interface, WiFi interface, network interface, a keyboard, a scanner, a microphone, a stylus, a touch sensitive pad or display. The output devices 144 output information associated with the system 100 (e.g., information to remote devices, information to a speaker, information to a display, for example, graphical representations of information). The processors 116 execute instructions for the system (e.g., applications). The storage devices 152 store a variety of information/data, including lidar range data generated by the system 100 and prior measurements. The display devices 148 display information associated with the system 100, for example, target information including their position, distance, type and the like, status information, configuration information and the like. The storage devices 152 can include, for example, long-term storage, such as a hard drive, a tape storage device, or flash memory; short-term storage, such as a random-access memory, or a graphics memory; and/or any other type of computer readable storage. In some embodiments, the process according to the disclosed invention is performed by the processing circuits 116, utilizing some or all of the components illustrated in FIG. 1.

In operation, as mentioned above, the processing circuit 116 may (by controlling the laser transmitter 108) transmit a plurality of laser pulses and detect (through the receiver 112) a plurality of return pulses. Each return pulse may be caused by the detection of one or more return photons or by noise (e.g., detector noise, or photons from other sources). The lidar system may, in operation, perform a series of "dwells" between which various system parameters (e.g., the pointing of the laser transmitter 108 and the receiver 112) may be changed.

The transmitted pulses, as mentioned above, may be pulses in a pulse position modulated waveform, each pulse being transmitted at a respective one of a plurality of pulse transmission times. Each of the pulse transmission times may be offset from a nominal transmission time (the nominal transmission times being evenly spaced at a repetition period corresponding to a repetition rate), e.g., by a respective pulse position modulation offset. Each pulse position modulation offset may have a magnitude that is at most one half of the repetition period. Each return pulse resulting from a transmitted pulse may, in such a case, arrive at a time (referred to as a "return pulse time") that is affected both by the pulse transmission time of the laser pulse that produced the return pulse and the range to the object (e.g., the target) from which the laser pulse scattered to produce the return pulse.

For a stationary target the cross-correlation of the set of pulse transmission times and the set of return pulse times may have a peak at a time offset equal to the (round-trip) light travel time from the lidar system to the target and back, each return pulse being received at a time that is later than the transmission of the corresponding laser pulse by a delay equal to the round-trip light travel time. For a suitably chosen pulse position modulation waveform, the cross-correlation may be significantly smaller for all other time offsets.

In some embodiments, the cross-correlation may be calculated from a plurality (e.g., a first vector) of pulse transmission times and a plurality (e.g., a second vector) of return pulse times by first forming a table of differences (e.g., as a two-dimensional array), flattening and sorting the array to form a sorted list of differences, and converting the list to a histogram by counting the number of elements of the sorted list that correspond to each element of the histogram. Such an approach may be computationally relatively burdensome, because, for example, if new data are received, the flattening and sorting of the array of differences may be repeated for an updated array including (i) all of the previously sorted differences and (ii) all of the differences formed from the new data.

Figure 2:
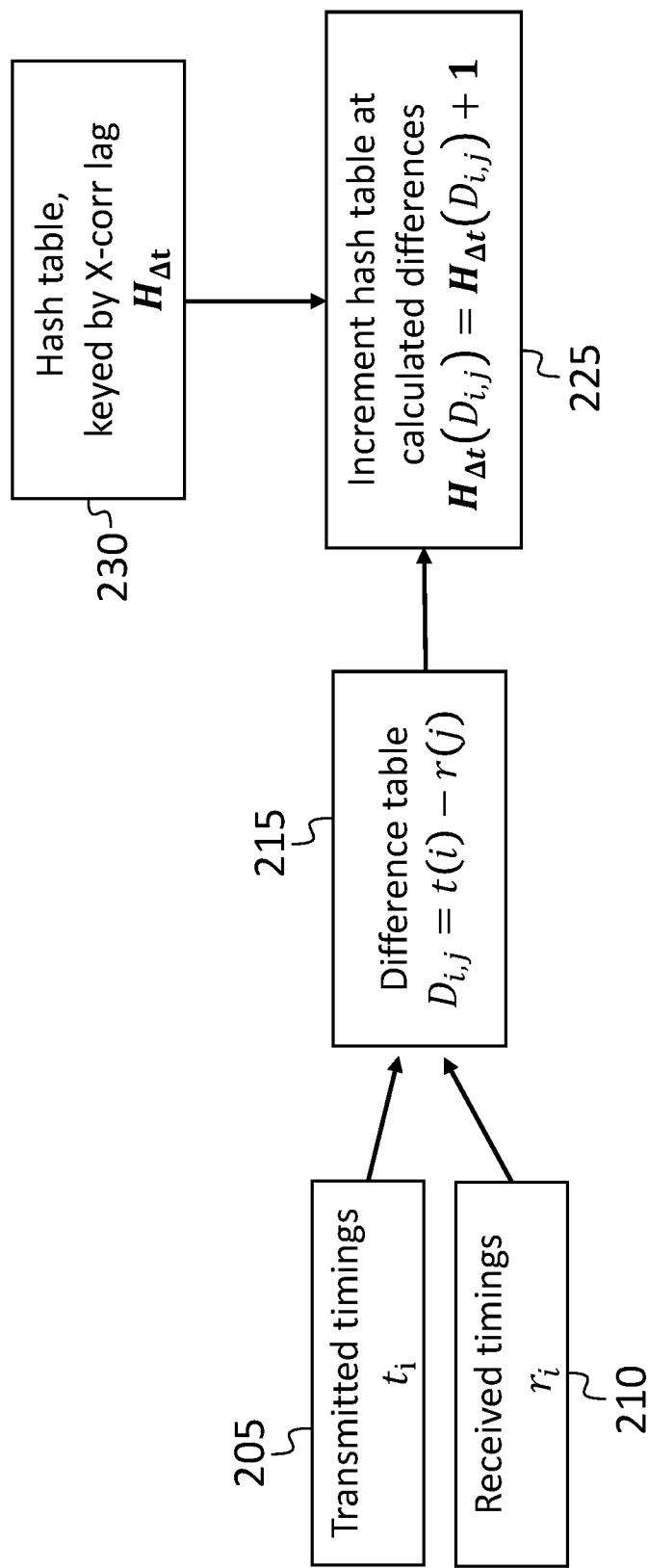
FIG. 2 is a hybrid data and flow diagram, according to an embodiment of the present invention.

In some embodiments, the cross-correlation may instead be calculated in a more efficient manner, illustrated in FIG. 2. The pairwise differences of (i) the plurality of pulse transmission times (or "transmitted timings") 205 and (ii) the plurality of return pulse times (or "received timings") 210 may be calculated (e.g., to form a table, or array, of differences 215). An index (or "key") into an array (or "hash table", or "cross-correlation array") 220 may then be formed based on each difference, and the element of the cross-correlation array corresponding to the respective index may be incremented (at 225) for each calculated difference. This process may result in the calculated cross-correlation being formed in the cross-correlation array. In some embodiments a table of differences is not formed, and instead each calculated difference is used to increment a corresponding element of the cross-correlation array without first having been stored in an array of differences together with other calculated differences. In some embodiments, one, or the other, or each of (i) the plurality of pulse transmission times 205 and (ii) the plurality of return pulse times 210 is sorted before the differences are calculated; for example, the return pulse times 210 may, in some embodiments, not be fully sorted. This may be the case, e.g., if the detector is read out one frame at a time; in such an embodiment, some of the return pulse times 210 may be read out, within a frame, in an order different from the order in which the detections occurred.

In some embodiments two nested loops are used to iterate over (e.g., in an outer loop) the pulse transmission times and over (e.g., in an inner loop) the return pulse times. In some embodiments, the outer loop instead iterates over the return pulse times and the inner loop iterates over the pulse transmission times. At each iteration of the inner loop, a difference between the current return pulse time and the current pulse transmission time is calculated, an index into the cross-correlation array is formed based on the difference, and the element, at the index, in the cross-correlation array is incremented (e.g., incremented by one, or incremented, as discussed in further detail below, by an amount different from one). Negative differences may be discarded, as not corresponding to a plausible target position. As used herein, "the difference between x and y", where x and y are two numbers, is x-y. If a calculated difference is out of range, e.g., it corresponds to an array index at which memory has not been allocated, or to an array index that is less than zero, then the calculated difference may be discarded, i.e., no further action may be taken based on its value.

Each of the pulse transmission times and each of the return pulse times may be represented by an integer, the integer representing a corresponding number of cycles of a clock (e.g., a 1 GHz clock) with respect to which the times are measured. The cross-correlation array may be set up in memory (e.g., in a memory that is connected to, or part of, the processing circuit 116) by allocating a region of memory having a size proportional to the number of distinct differences for which the cross-correlation array is to be calculated. For example, if the minimum difference is (or is expected to be) 1,000 clock cycles and the maximum difference is (or is expected to be) 10,000 clock cycles, then a region of memory capable of storing an array with 9001 elements may be allocated. If the memory is byte-addressable and each array element has a size of n bytes (e.g., 4 bytes if the elements of the cross-correlation array are long integers or long fixed-point numbers), then the size of the allocated region of memory may be 9001×4 bytes, i.e., 36,004 bytes in this example.

More generally, the allocated region of memory may have a size, in memory words (e.g., in bytes), equal to the number of elements of the cross-correlation array times the number of memory words used to store each array element. As used herein, a "memory word" is the size of a separately addressable memory element. The index corresponding to a difference may be calculated by multiplying the difference by n (where n is the number of memory words used to store each element of the cross-correlation array, i.e., n is the change in a pointer value required to change from (i) pointing to one element of the cross-correlation array to (ii) pointing to an adjacent element of the cross-correlation array), and adding a constant (the constant being selected to map the range of delays for which the cross-correlation array is to be calculated to the range of memory addresses at which the cross-correlation array is stored).

In some embodiments, a region of memory is allocated, based on a plurality of return pulse times and on a plurality of pulse transmission times, such that the region of memory is sufficiently large to store the minimum difference (e.g., a difference between an earliest return pulse time of the plurality of return pulse times and a latest pulse transmission time of the plurality of pulse transmission times) and the maximum difference (a difference between a latest return pulse time of the plurality of return pulse times and an earliest pulse transmission time of the plurality of pulse transmission times) and every difference in between. In some embodiments a smaller region of memory may be allocated, corresponding to a range of differences based on a known or estimated range to the target. This range of differences may be, for example, a range centered on the round-trip delay to the target, and extending in either direction by an amount corresponding, for example, to uncertainty in the estimated range to the target, or to the range rate of the target, if the target range is changing.

In some embodiments, updates to the cross-correlation array are made in batches, with each batch (or subset) of pulse transmission times and return pulse times selected, or approximately selected, to produce differences that fall within the range of differences covered by the cross-correlation array. For example, in some embodiments the lidar is operated in a burst mode in which bursts of laser pulses are transmitted, each burst being followed by an "inter-burst interval" during which transmission of laser pulses is halted (e.g., to reduce noise in the receiver caused by atmospheric backscatter). In such a case the pulse transmission times corresponding to a burst may be handled as a batch, and a corresponding batch of return pulse times may be used to form differences with the batch of pulse transmission times, the batch of return pulse times having been selected to produce differences that fall within the range of differences covered by the cross-correlation array.

The elements of the cross-correlation array may be stored as, for example, unsigned integers (e.g., 16-bit unsigned integers), long unsigned integers (e.g., 32-bit unsigned integers), floats (e.g., 32-bit signed floating point numbers), doubles (e.g., 64-bit signed floating point numbers), or long doubles (e.g., 80-bit signed floating point numbers with padding to 128 bits).

In some embodiments the cross-correlation array is cleared at the end of each dwell. Within a dwell, the values of the cross-correlation array may periodically be attenuated (e.g., every 10 ms, each value may be multiplied by a positive "attenuation factor" less than 1, e.g., each value may be multiplied by 0.875) so that the cross-correlation array stores a weighted sum of differences, with each difference contributed to the cross-correlation array being weighted progressively less heavily as time passes. Such an embodiment may be advantageous, for example, in situations in which the range to the target is changing and in which the current range to the target is of greatest interest. In such an embodiment, the cross-correlation array elements may be floating point numbers or, e.g., fixed-point numbers, or, equivalently, integers (and, if they interpreted to be integers, the increment added to an array element, when a calculated time difference is mapped to the array element, may be greater than 1, e.g., it may be 256 if the integer is equivalent to a fixed point number with seven bits to the right of the binary point).

In some embodiments, the system and method disclosed herein is efficient both in terms of computational burden and in terms of memory use. For N total differences, the computation of the difference table is $\Omega(N)$, and insertion into the hash table is also $\Omega(N)$. Moreover, when operating in a batched mode all calculations are only a function of the amount of new data per batch, and, as such, for constant batch size, the calculations are $\Omega(1)$. The total storage space used to store the cross-correlation array algorithm is equal to the total number of unique differences (i.e., cross-correlation lags). This number may be a weak function of the total number of transmitted pulses, because the number of unique lags may tend to increase as more data are collected, but not at a constant rate. Furthermore, any constraints on the target's range may decrease the total potential storage needed for the hash table, as mentioned above. The worst-case memory usage may be O(N), for N transmitted pulses; this is the best possible space requirement that can be achieved, as this amount of space may be used for storing the cross-correlation itself.

As used herein, the word "or" is inclusive, so that, for example, "A or B" means any one of (i) A, (ii) B, and (iii) A and B. As used herein, the term "array" refers to an ordered set of numbers regardless of how stored (e.g., whether stored in consecutive memory locations, or in a linked list). As used herein, when a first quantity (e.g., a first number) is referred to as being "based on" a second quantity (e.g., a second number) it means that the second quantity influences the first quantity, e.g., the second quantity may be an input (e.g., the only input, or one of several inputs) to a function that calculates the first quantity, or the first quantity may be equal to the second quantity, or the first quantity may be the same as (e.g., stored at the same location or locations in memory) as the second quantity.

The term "processing circuit" is used herein to mean any combination of hardware, firmware, and software, employed to process data or digital signals. Processing circuit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing circuit, as used herein, each function is performed either by hardware configured, i.e., hard-wired, to perform that function, or by more general-purpose hardware, such as a CPU, configured to execute instructions stored in a non-transitory storage medium. A processing circuit may be fabricated on a single printed circuit board (PCB) or distributed over several interconnected PCBs. A processing circuit may contain other processing circuits; for example, a processing circuit may include two processing circuits, an FPGA and a CPU, interconnected on a PCB.

Although limited embodiments of a system and method for calculating a cross-correlation have been specifically described and illustrated herein, many modifications and variations will be apparent to those skilled in the art. Accordingly, it is to be understood that a system and method for calculating a cross-correlation employed according to principles of this invention may be embodied other than as specifically described herein. The invention is also defined in the following claims, and equivalents thereof.

What is claimed is:

1. A method for operating a laser detection and ranging system, the method comprising:
    transmitting a plurality of laser pulses, each at a respective one of a plurality of pulse transmission times;
    detecting a plurality of return pulses, each at a respective one of a plurality of return pulse times;
    forming a first time difference, the first time difference being a difference between a first return pulse time of the plurality of return pulse times and a first pulse transmission time of the plurality of pulse transmission times;
    forming a first element of a cross-correlation array based on the first time difference;
    incrementing the first element of the cross-correlation array by n to form a second element of the cross-correlation array, where n is an integer based on a second time difference between a second pulse transmission time and a second return pulse time;
    forming a first index to the first element of the cross-correlation array based on the first time difference;
    forming a second index to the second element of the cross-correlation array based on the second time difference; and
    estimating a range to a target based on the cross-correlation, the first index and the second index.

2. The method of claim 1, wherein the first element of the cross-correlation array has a size of n memory words.

3. The method of claim 1, further comprising calculating a plurality of time differences including the first time difference and the second time difference, the calculating of the plurality of time differences comprising calculating all time differences between a first subset of the pulse transmission times and a first subset of the return pulse times.

4. The method of claim 3, further comprising calculating all time differences between a second subset of the pulse transmission times and a second subset of the return pulse times, wherein:
    a pulse transmission time of the second subset of the pulse transmission times is greater than a pulse transmission time of the first subset of the pulse transmission times, and
    a pulse transmission time of the second subset of the return pulse times is greater than a pulse transmission time of the first subset of the return pulse times.

5. The method of claim 1, wherein:
    the transmitting of the plurality of laser pulses comprises transmitting a first burst of laser pulses of the plurality of laser pulses, waiting during an inter-burst interval, and transmitting a second burst of laser pulses of the plurality of laser pulses;
    each of the pulse transmission times of the first subset of the pulse transmission times is a pulse transmission time of a pulse of the first burst; and
    each of the pulse transmission times of the second subset of the pulse transmission times is a pulse transmission time of a pulse of the second burst.

6. The method of claim 1, further comprising allocating a region of memory for the cross-correlation array, the region of memory having a size based on the difference between:
    the difference between an earliest return pulse time of the plurality of return pulse times and a latest pulse transmission time of the plurality of pulse transmission times; and
    the difference between a latest return pulse time of the plurality of return pulse times and an earliest pulse transmission time of the plurality of pulse transmission times.

7. The method of claim 1, further comprising:
    estimating a range to a target, and
    allocating a region of memory for the cross-correlation array, the region of memory having a size based on an uncertainty in the estimated range to the target.

8. The method of claim 7, further comprising multiplying each element of the cross-correlation array by an attenuation factor, the attenuation factor being a positive number less than 1.

9. A laser detection and ranging system, comprising:
    a laser transmitter;
    a receiver; and
    a processing circuit,
    the processing circuit being configured to:
        transmit, through the transmitter, a plurality of laser pulses, each at a respective one of a plurality of pulse transmission times;
        detect, using the receiver, a plurality of return pulses, each at a respective one of a plurality of return pulse times;
        form a first time difference, the first time difference being a difference between a first return pulse time of the plurality of return pulse times and a first pulse transmission time of the plurality of pulse transmission times;

form a first element of a cross-correlation array based on the first time difference;
increment the first element of the cross-correlation array by n to form a second element of the cross-correlation array, where n is an integer based on a second time difference between a second pulse transmission time and a second return pulse time;
form a first index to the first element of the cross-correlation array based on the first time difference;
form a second index to the second element of the cross-correlation array based on the second time difference; and
estimate a range to a target based on the cross-correlation, the first index and the second index.

10. The system of claim 9, wherein the first element of the first array has a size of n memory words, and the index of the second element of the first array equals n times the second time difference plus the offset.

11. The system of claim 9, wherein the processing circuit is further configured to calculate a plurality of time differences including the first time difference, the calculating of the plurality of time differences comprising calculating all time differences between a first subset of the pulse transmission times and a first subset of the return pulse times.

12. The system of claim 11, wherein the processing circuit is further configured to calculate all time differences between a second subset of the pulse transmission times and a second subset of the return pulse times, wherein:
a pulse transmission time of the second subset of the pulse transmission times is greater than a pulse transmission time of the first subset of the pulse transmission times, and
a pulse transmission time of the second subset of the return pulse times is greater than a pulse transmission time of the first subset of the return pulse times.

13. The system of claim 12, wherein:
the transmitting of the plurality of laser pulses comprises transmitting a first burst of laser pulses of the plurality of laser pulses, waiting during an inter-burst interval, and transmitting a second burst of laser pulses of the plurality of laser pulses;
each of the pulse transmission times of the first subset of the pulse transmission times is a pulse transmission time of a pulse of the first burst; and
each of the pulse transmission times of the second subset of the pulse transmission times is a pulse transmission time of a pulse of the second burst.

14. The system of claim 9, wherein the processing circuit is further configured to allocate a region of memory for the first array, the region of memory having a size based on the difference between:
the difference between an earliest return pulse time of the plurality of return pulse times and a latest pulse transmission time of the plurality of pulse transmission times; and
the difference between a latest return pulse time of the plurality of return pulse times and an earliest pulse transmission time of the plurality of pulse transmission times.

15. The system of claim 9, wherein the processing circuit is further configured to:
estimate a range to a target, and
allocate a region of memory for the first array, the region of memory having a size based on an uncertainty in the estimated range to the target.

16. The system of claim 15, wherein the processing circuit is further configured to multiply each element of the first array by an attenuation factor, the attenuation factor being a positive number less than 1.

* * * * *